Nov. 10, 1931.　　　C. A. BANKHEAD　　　1,830,868
BRAKE SHOE GRINDER
Filed June 28, 1930　　　3 Sheets-Sheet 1
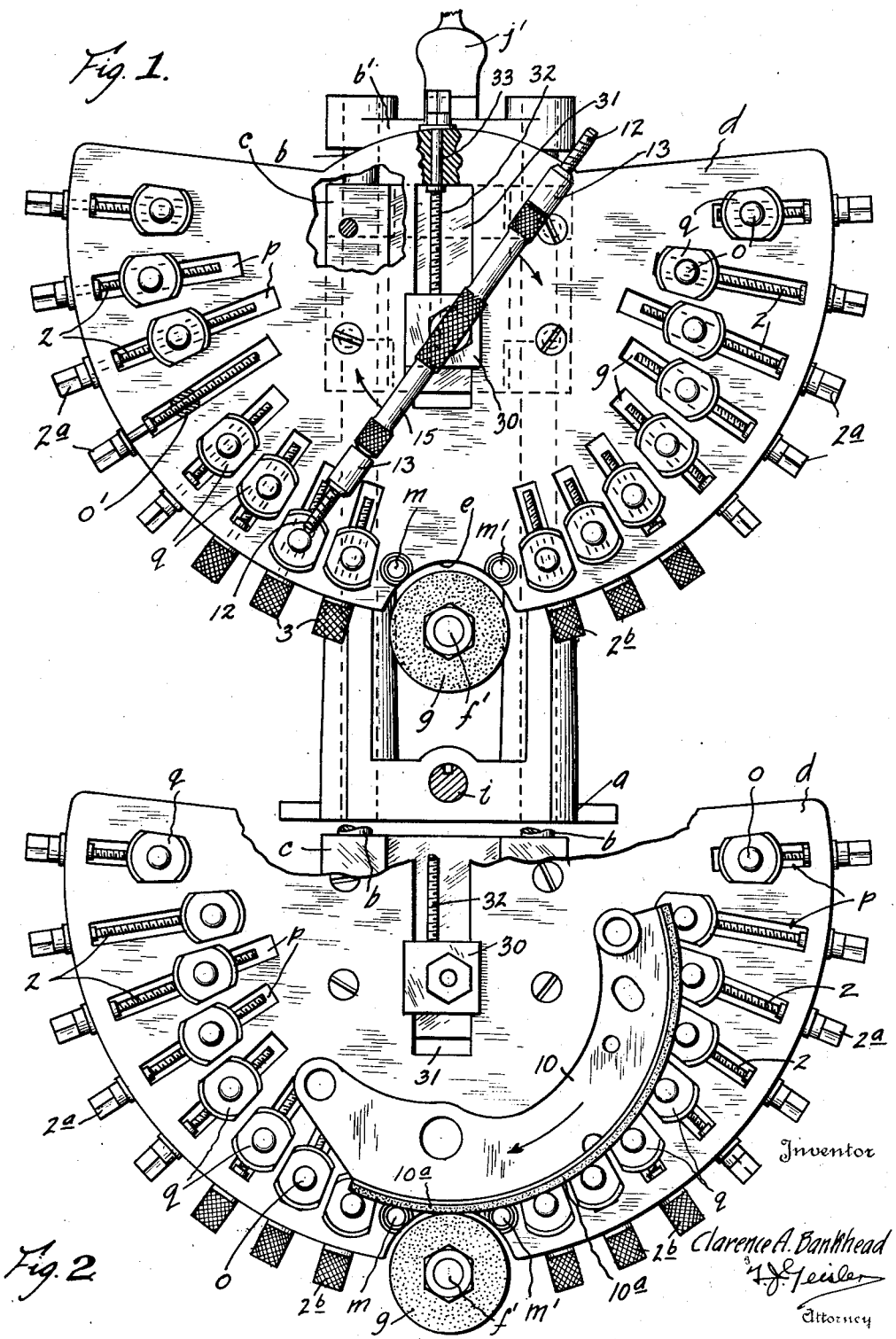

Nov. 10, 1931.  C. A. BANKHEAD  1,830,868
BRAKE SHOE GRINDER
Filed June 28, 1930   3 Sheets-Sheet 2
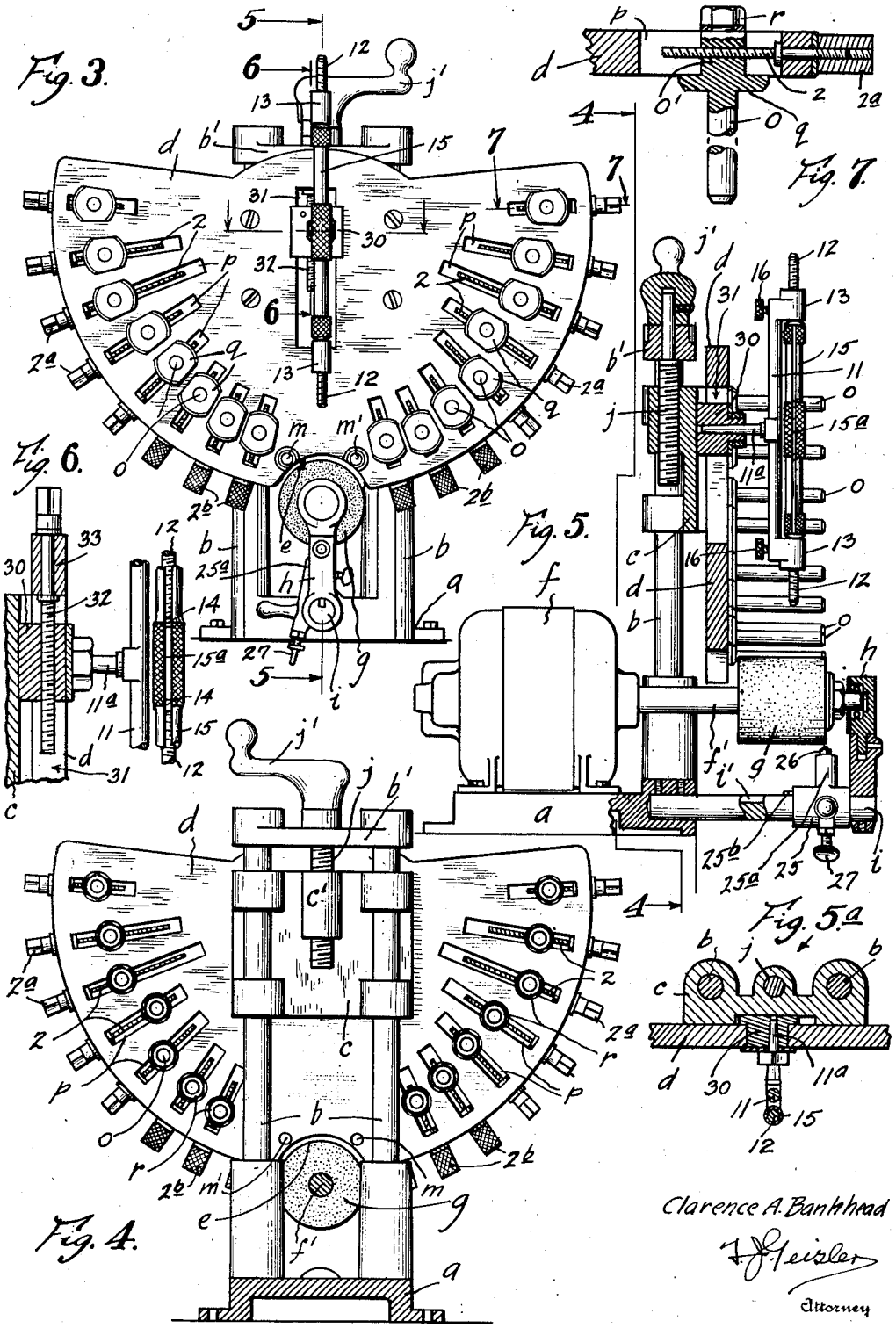
Clarence A. Bankhead
Attorney Nov. 10, 1931.  C. A. BANKHEAD  1,830,868
BRAKE SHOE GRINDER
Filed June 28, 1930   3 Sheets-Sheet 3

Inventor:
Clarence A. Bankhead
Attorney

Patented Nov. 10, 1931

1,830,868

UNITED STATES PATENT OFFICE

CLARENCE A. BANKHEAD, OF PORTLAND, OREGON, ASSIGNOR TO BANKHEAD & WALTER, INC., OF PORTLAND, OREGON, A CORPORATION OF OREGON

BRAKE SHOE GRINDER

Application filed June 28, 1930. Serial No. 464,632.

My invention relates to machines for grinding arcuate surfaces, and particularly to machines for grinding the linings of the shoes of internal motor-vehicle brakes.

In this type of brake, which comprises complementary arcuate brake shoes located within the brake drum and adapted to be brought to bear against the internal periphery of the latter—it is essential that the curvature of the shoes conform closely with that of the brake drum; otherwise the entire surfaces of the shoes will not be in contact with the internal periphery of the brake drum, with a consequent loss in braking force and injury to the brake lining and drum, since the resulting unequal pressure heats and burns the lining and causes it to score the drum and is frequently the cause of squeaking brakes.

The failure of the brake shoes to conform with the curvature of the drum occurs most frequently when the brake shoes have been re-lined, due to the variation in the thickness of the lining, and because, in service, the drum tends to wear so that the internal diameter of its peripheral flange is increased, and the original shoe, when re-lined, will no longer conform with the curvature of said flange.

Therefore, the object of my invention is to provide a simple and practical machine conveniently and accurately adjustable, for grinding the linings of the brake shoes of internal vehicle brakes to a given arc which conforms with the segment of the circle of the flange of the drum with which they are intended to cooperate; whereby the entire surface of the lining of the brake shoe will be brought into contact with the drum flange and an efficient and quietly operating brake will result, which in service will not burn the lining nor score the brake drum flange.

A still further object of my invention is to provide such a machine adapted for operating upon the brake shoes of a large range of sizes and kinds of internal brakes.

I attain the objects of my invention by providing a supporting element carrying, or adapted to be arranged in relation to, a rotary grinder, and providing on such supporting element a gauge caliper revolubly supported, for convenience preferably removably, and lineally adjustable relatively to a gauge pin carried by the supporting element whereby to describe the circles of different diameters touched by said gauge pin; and providing, further, said supporting element with a series of radially arranged work holding pins, adjustable to the arc of the circle, or circles, described by said gauge-caliper; whereby the gauge-caliper may first be used to ascertain the arc to which the lining of the brake shoe is to be ground, and then to support the brake shoe on said work-holding pins in correspondence with said arc, for being operated upon by the grinder.

These and other incidental features of my invention, the details of construction and mode of operation are hereinafter further described with reference to the accompanying drawings.

In the drawings:

Fig. 1 shows a front elevation of my machine and illustrates how the work holding means are adjusted;

Fig. 2 shows a fragmentary view similar to Fig. 1 and illustrates a brake shoe in place on the machine for being operated upon;

Fig. 3 shows a front elevation of my machine and illustrates the details of construction;

Fig. 4 shows a rear elevation of my machine partly in section, taken on the line 4—4 of Fig. 5, and illustrates how the plate is adjusted relatively to the grinding element;

Fig. 5 shows a section taken on the line 5—5 of Fig. 3 and illustrates further details of construction;

Fig. 5a shows a section taken on the line 5a of Fig. 3;

Fig. 6 shows a section taken on the line 6—6 of Fig. 3 and illustrates how the gauging caliper is centered on the frame;

Fig. 7 shows a section taken on the line 7—7 of Fig. 3; and illustrates the gauge caliper in detail;

Referring now to the figures: My machine comprises a base $a$ having upright standards $b$, upon which are slidably mounted a bracket $c$, carrying a vertically arranged, preferably semi-circular plate $d$. The plate $d$ is arranged with its diametrical edge uppermost and an arcuate notch $e$ is provided in the bottom edge.

A grinding element is provided comprising a grinder $g$ driven by an electric motor $f$ which is mounted on the base $a$. The grinder $g$ is arranged more or less within the notch $e$ and with its axis of rotation transverse to the plate $d$. The outer end of the grinder shaft $f'$ is journaled in a bearing $h$ carried on an arm $i$ projecting laterally from the base $a$.

The means constituting the adjustable work support for the brake shoes adapted to hold and guide a brake shoe 10 for the grinding of its lining 10$a$ to a given arc, see Fig. 2, comprises fixed, laterally projecting gauge pins $m$, $m'$ arranged on each side the notch $e$ and radially adjustable pins $o$, see Fig. 7, arranged in arcuate alignment on each side of the gauge pins $m$, $m'$ in radial slots $p$, extending inwardly from adjacent the edge of the plate. The pins $o$ are provided with shoulders $q$ bearing against the face of the plate $d$ and with nuts $r$ on their inner ends by which they are clamped in position in the grooves.

Adjusting screws 2 are inserted through the edge of the plate $d$ so as to project into the radial slots $p$, see Figs. 2 and 7, where they are threaded transversely through the inner ends of the pins $o$, as at $o'$. Square heads 2$a$ are provided on the screws 2, except at 2$b$ where they are for convenience provided with knurled heads for manual operation, since the relative adjustment of these studs is less than the others and it is somewhat inconvenient to operate them with a wrench.

The plate $d$ is adjustable on the standard $b$ relative to the grinder $g$ by means of an adjusting screw $j$ having a handle $j'$ carried by a cross member $b'$ on the upper ends of the standards $b$ and threaded into a boss $c'$ on the rear of the bracket $c$. These means permit the adjustment of the work holding means relatively to the grinder by which the amount of grinding to which the shoe lining is to be subjected may be regulated.

Figure 8:
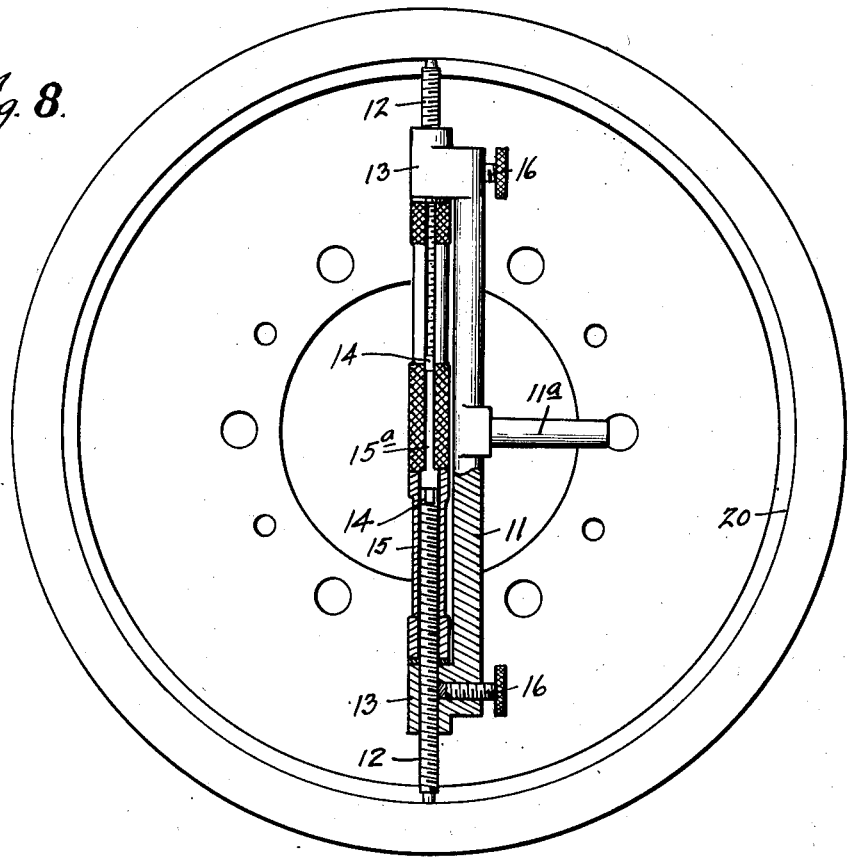
Fig. 8 shows an elevation of the brake drum and illustrates how the gauge caliper is set to the diameter of the brake drum.

In order to provide means for gauging the adjustment of the pins $o$ so as to conform to a segment of the circle of a given brake drum 20, see Fig. 8, in which the brake shoe 10 is intended to operate, I have provided a gauge-caliper, see Figs. 5 and 8, comprising a bracket 11 having a spindle 11$a$ projecting laterally from its longitudinal center. Bosses 13 are provided on each end of the bracket 11 in which gauge screws 12 having right and left threads, respectively, are threaded. The inner ends of the gauge screws 12 are arranged in a sleeve 15, located between the bosses 13, and having a longitudinal slot 15$a$ in which keys 14, in the inner ends of the screws 12, are slidable.

By these means, the gauge screws 12 may be projected equally from each end of the bracket by the rotation of the sleeve 15. Set screws 16 are provided in the bosses 13, respectively, for clamping the gauge screws in a given position.

In use, the gauge-caliper is first arranged diametrically in the brake drum 20, as illustrated in Fig. 8, and the sleeve rotated until the ends of the gauge screws 12 touch opposite diametrical points on the interior of the drum. The gauge screws 12 are then clamped in position by the set screws 16.

The gauge-caliper is then transferred to my machine and the spindle 11$a$ is inserted in a journal block 30, see Figs. 5 and 6, arranged in a perpendicular slot 31 in the plate $d$. The axis of the journal block is arranged in perpendicular alignment with the axis of rotation of the grinder and vertically adjustable by means of an adjusting screw 32 threaded in the block and carried by the upper edge of the said plate as at 33.

The journal block 30 is then adjusted vertically until either one of the screws 12 just touch the gauge pins $m$, $m'$. The gauge is then rotated about the axis of the spindle 11$a$ and the adjustable pins $o$ are successively adjusted by means of the screws 2 until in position to just touch the end of the gauge screw 12, as the gauge is rotated, as shown in Fig. 1, in which the studs on the right have been adjusted to lie on an arc which is a segment of the circle of the brake drum 20.

Thus, when all the pins $o$ have been adjusted, as shown in Fig. 2, to conform with the circle of the brake drum, the gauge-caliper is removed, and a brake shoe is placed on the said pins so that its adjacent edge is in contact with the shoulders $q$ of the pins $o$, so as to be held in alignment thereon. The shoe is then moved back and forth by manual means and the high portions of the lining 10$a$ are brought into contact with the grinder $g$, whereby the lining will be ground to conform with the curvature of the drum, as determined by the said gauge-caliper.

Figure 9:
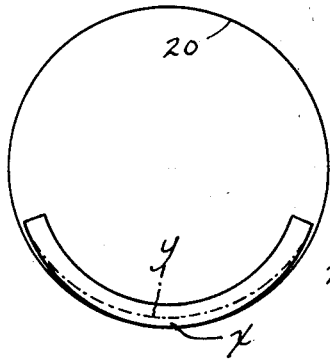
Figs. 9 and 10 show, respectively, exaggerated diagrammatic figures illustrating brake shoes which fail to conform with the circle of the brake drums.

In Fig. 9 is illustrated a brake drum worn in service until its diameter is enlarged (somewhat exaggerated because actually such differences are barely preceptible to the eye). In this case the re-lined shoe 10 only touches the drum at its middle, indicated at $x$, so that the shoe in order to make it touch the drum at all points must be ground away until its curvature is as shown by the broken line $y$.

Figure 10:
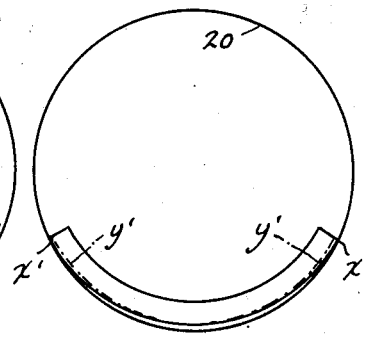
Figure 11:
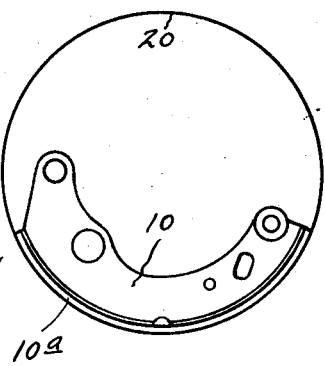
Fig. 11 shows diagrammatically a brake shoe, the lining of which has been ground to conform with the circle of the brake drum.

Similarly, Fig. 10 shows a brake shoe which, when re-lined only touches the drum at its ends (exaggerated as at $x'$) and must be ground until it conforms with the broken line $y'$. Fig. 11 shows the brake shoe when ground to conform with the curvature of the drum so as to touch at all points on its lining.

In the operation of my machine, it is essential that the periphery of the grinder be maintained in true cylindrical form in order that the shoe lining $10a$ will be ground evenly, transversely. For this purpose, I have provided a sleeve 25 on the arm $i$ having an upright socket $25a$ in which a diamond tip 26 is provided, arranged adjacent the grinder $g$. The sleeve 25 is longitudinally movable on the arm $i$ by means of a key $25b$ riding in a keyway $i'$ in the said arm. Thus, to dress or true the grinder $g$, the sleeve 25 and diamond tip 26 are moved transversely across the wheel. A set screw 27 is provided in the sleeve for holding the diamond tip out of contact with the grinder.

I claim:

1. In combination, a supporting element adapted to be arranged in adjustable relation to a rotary grinder, and a gauge pin carried by the supporting element, a gauge-caliper revolubly supported on said element and lineally adjustable to describe circles of different diameters touched by said gauge pin, a series of radially arranged work-holding pins carried by said supporting element and adjustable to arcs of said circles.

2. In combination, a supporting element adapted to be arranged in adjustable relation to a rotary grinder, and a gauge pin carried by the supporting element, a gauge-caliper revolubly supported on said element and lineally adjustable to describe circles of different diameters touched by said gauge pin, radially disposed slots provided in said supporting element, work-holding pins provided with shanks bearing in said slots, respectively; means for moving and securing said shanks in said slots.

3. A frame adapted to be arranged in relation to a rotary grinder, a plate adjustably supported by said frame said plate provided with a gauge pin and recessed to receive a peripheral segment of said grinder and provided with a series of radially disposed slots, means for revolubly supporting a gauge-caliper on said plate at variable points centrally of said slots, a series of work-holding pins provided with shanks movably secured in said radial slots, whereby to position said pins to represent arcs of the circle described by said gauge-caliper.

4. A frame adapted to be arranged in relation to a rotary grinder, a plate adjustably supported by said frame, said plate provided with a gauge pin and recessed to receive a peripheral segment of said grinder and provided with a series of radially disposed slots, a gauge-caliper movably and revolubly supported on said plate at variable points centrally of said slots, said caliper lineally adjustable to describe circles of different diameters touched by said gauge pin, a series of work-holding pins provided with shanks movably secured in said radial slots, whereby to position said pins to represent arcs of the circle described by said gauge-caliper.

5. A frame adapted to be arranged in relation to a rotary grinder, a plate adjustably supported by said frame, said plate provided with a gauge pin and recessed to receive a peripheral segment of said grinder, and provided with a series of radially disposed slots, said plate provided also with an elongate slot coinciding with a diameter of the circle of which said slots represent radii, a block adjustable in the latter slot, said block adapted to support revolubly a gauge-caliper, a series of work-holding pins provided with shanks movably secured in said radial slots, whereby to position said pins to represent arms of the circle described by said gauge-caliper.

6. A frame adapted to be arranged in relation to a rotary grinder comprising standards and a bracket slidably supported thereby, a plate carried by said brackets, said plate provided with a gauge pin and recessed to receive a peripheral segment of said grinder and provided with a series of radially disposed slots, means carried on said plate for revolubly supporting a gauge-caliper, such means lineally movably on a diameter of the circle of which said slots represent radii, a series of work-holding pins provided with shanks movably secured in said radial slots, whereby to position said pins to represent arcs of the circle described by said gauge-caliper.

7. In combination with a base carrying a rotary grinder, a frame adapted to be arranged in relation to a rotary grinder mounted on said base, a plate adjustably supported by said frame, said plate provided with a gauge pin and recessed to receive a peripheral segment of said grinder and provided with a series of radially disposed slots, means for revolubly supporting a gauge-caliper on said plate at variable points centrally of said slots, a series of work-holding pins provided with shanks movably secured in said radial slots, whereby to position said pins to represent arcs of the circle described by said gauge-caliper.

8. In combination, a supporting element adapted to be arranged in relation to a rotary grinder and adjustable in a plane intersecting the axis of rotation of the latter, a gauge-pin carried by the supporting element, a series of radially arranged and radially adjustable work-holding pins carried by said supporting element, and means for revolubly supporting a gauge caliper on said supporting elements in said plane, to describe the circle touched by said gauge pin, whereby to define the arc to which said work-holding pins must be adjusted to support the work for being operated upon by the grinder.

CLARENCE A. BANKHEAD.